United States Patent Office 3,378,116
Patented Apr. 16, 1968

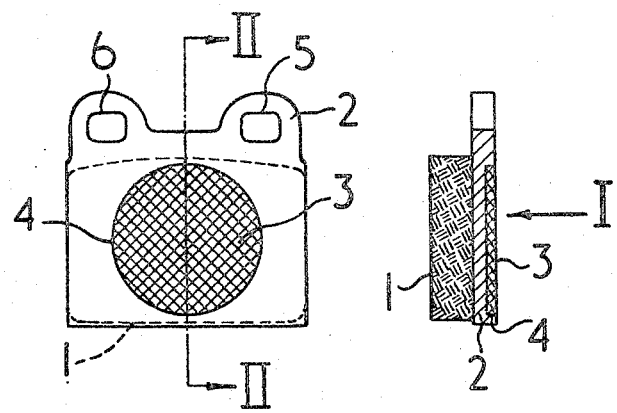
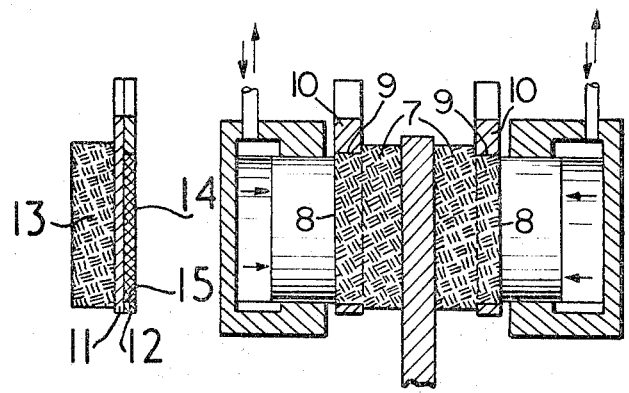
FIG.1 FIG.2 FIG.4 FIG.3

3,378,116
FRICTION PAD FOR DISC BRAKES
Erich Hennig, Konigstein, Taunus, Germany, assignor to Dunlop Rubber Company Limited, London, England, a corporation of Great Britain
Filed Jan. 13, 1966, Ser. No. 538,878
Claims priority, application Germany, Jan. 16, 1965, T 27,834
6 Claims. (Cl. 188—250)

This invention relates to disc brakes, particularly to disc brakes of the kind which is fitted to motor vehicles, and to friction elements for disc brakes.

A disc brake for a motor vehicle may comprise a rotatable disc and a caliper fixed to a nonrotatable support, the caliper having a pair of axially slidable friction elements for engagement with opposite sides of the disc and a pair of hydraulic cylinders one at each side of the disc for pressing the friction elements into engagement with the disc. In one kind of disc brake the friction element each consist of pad of friction material bonded or otherwise secured to a rigid metal backing plate which is guided for axial movement relative to the disc by axially extending abutments formed in the caliper and engaging the side edges of the backing plates, the pads also being located in the caliper by means of a pair of pins passing through holes in the backing plates, the pins being fixed to the caliper and extending axially adjacent the outer periphery of the disc. Pressure is applied to the metal backing plates to operate the brake.

One object of the invention is to reduce the noise which may be generated in operation of a disc brake of this kind.

According to one aspect of the invention, a friction element for a disc brake comprises a pad of friction material secured to one side of a rigid backing plate, the other side of the backing plate comprises an area of vibration damping material for engagement with the brake-applying mechanism of a disc brake.

According to another aspect of the invention, a disc brake comprises a rotatable disc, a caliper mounted on a nonrotatable support, a friction element axially slidably supported in the caliper and comprising a pad of friction material secured to a rigid backing plate, and a brake-applying mechanism including a thrust member for pressing a friction element towards the disc, a damping element being provided to transmit the brake-applying thrust to the friction element.

In a preferred embodiment of the invention, a friction element for a disc brake comprises a pad of friction material secured to one side of a backing plate which is provided on its other side with a recess containing a disc of vibration damping material which may, for example, be of a similar nature to the friction material used in the pad, to provide an area of damping material for engagement with the piston of an associated hydraulic brake-applying mechanism.

The vibration damping element may alternatively be secured to the piston of the brake-applying mechanism, or may consist of a portion of the material of the friction pad extending through an aperture in the backing plate.

Three embodiments of the invention will now be described, by way of example, with reference to the accompanying drawings, in which:

FIGURE 1 shows a friction element viewed in the axial direction of an associated disc brake, as indicated by the arrow I in FIGURE 2;

FIGURE 2 is a cross-sectional side elevation of the friction element shown in FIGURE 1, the cross-section being taken on line II—II of FIGURE 1;

FIGURE 3 is a similar view to FIGURE 2 showing a modified form of friction element;

FIGURE 4 is a similar view to FIGURE 2 showing a further modified form of friction element.

The friction element shown in FIGURES 1 and 2 comprises a friction pad 1 bonded to one side of a metal backing plate 2. A disc 3 of vibration damping material is bonded into a recess 4 formed in the rear face of the backing plate 2 to provide an area of vibration damping material for engagement with the brake-applying mechanism of a disc brake.

The disc 3 is arranged to be of larger diameter than that of the associated piston (not shown) of the brake-applying mechanism so that when the friction element is mounted in a disc brake on a pair of pins passing through holes 5 and 6 in the backing plate 2, the piston engages the disc 3 only and the whole thrust to the friction pad 1 is transmitted through the disc 3 in the direction indicated by the arrow I. The disc 3 constitutes a damping element which tends to suppress noise-producing vibrations which arise during operation of the brake.

The vibration damping material from which the disc 3 is formed should have a composition which will be sufficiently yielding for the suppression of vibration, while having sufficient rigidity to transmit the brake-applying thrust without requiring an unduly large displacement of the brake-applying mechanism. The selection of a suitable material will, therefore, depend on the conditions of operation in the particular circumstances of any given brake construction. In many cases, however, the friction pad material itself will be found to provide the required characteristics.

In the alternative construction shown in FIGURE 3, a friction pad 7 is provided with a spigot 8 of similar shape and diameter to the disc 3 of the previous embodiment, the spigot 8 extending through an aperture 9 in the backing plate 10 to form an area of vibration damping material on the other side of the backing plate.

FIGURE 4 shows a further alternative arrangement in which the backing plate is formed from two component plates 11 and 12 secured together, for example by welding. The plate 11 has a friction pad 13 bonded thereto, and the plate 12 has a disc 14 of vibration damping material fitted into an aperture 15 in the plate and bonded both to the plate 11 and the plate 12. This construction provides a relatively inexpensive way of manufacturing a friction element of the general kind shown in FIGURES 1 and 2, since the aperture 15 in the plate 12 can be produced by a simple stamping operation, thus avoiding the necessity of machining a suitable recess in a one-piece backing plate as shown in FIGURE 2.

In the embodiments described above, the vibration damping element forms an integral part of the friction element, but in alternative constructions according to the invention, a vibration damping element may be incorporated in any convenient manner between a thrust member of a brake-applying mechanism and the friction element.

While the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention and it is intended that such revisions and adaptations which incorporate the herein disclosed principles will be included within the scope of the following claims as equivalents of the invention.

What I claim is:

1. In combination with a disc brake having a rotatable disc, the structure comprising a pair of friction elements nonrotatably supported one on each side of the disc and axially movable into engagement therewith, at least one of said friction elements comprising a rigid metal backing, a pad of friction material secured to one side of said rigid metal backing, the other side of said backing including an area of nonmetallic vibration-damping material secured to and forming the thrust surface for said friction element, and a fluid-pressure-operated brake actuating mechanism acting against said vibration-damping material for effecting engagement between said friction element and the disc, said mechanism comprising a piston-and-cylinder assembly wherein said piston acts substantially solely upon the area of vibration-damping material.

2. A friction element according to claim 1 wherein the backing is provided with an aperture through which the friction material extends to form an area of vibration damping material on the other side of the backing.

3. A friction element according to claim 1 wherein the backing is formed from two plate members secured together, one plate member carrying the friction pad and the other plate member having an aperture in which the area of vibration damping material is located.

4. A friction element according to claim 1 wherein the damping material is secured in a recess formed in the backing.

5. A friction element according to claim 4 wherein the damping material is of similar composition to the pad of friction material.

6. A friction element according to claim 4 wherein the area of vibration damping material consists of a circular disc-shaped piece of said material inserted into a recess in the backing.

References Cited

UNITED STATES PATENTS

| | | | |
|---|---|---|---|
| 2,801,714 | 8/1957 | Dotto | 188—152 |
| 3,179,209 | 4/1965 | Lucien et al. | 188—73 X |
| 3,190,397 | 6/1965 | Sadres | 188—250 X |
| 3,220,512 | 11/1965 | Coatalen | 188—73 |
| 3,245,508 | 4/1966 | Livezey | 188—1 |

FOREIGN PATENTS

| | | |
|---|---|---|
| 632,955 | 12/1961 | Canada. |
| 1,090,611 | 10/1954 | France. |
| 1,372,382 | 10/1963 | France. |

MILTON BUCHLER, *Primary Examiner.*

G. E. A. HALVOSA, *Assistant Examiner.*